United States Patent [19]
Bühren et al.

[11] Patent Number: 5,477,958
[45] Date of Patent: Dec. 26, 1995

[54] COP INDIVIDUALIZING APPARATUS

[75] Inventors: Heinz Bühren; Alfred Schmitz, both of Monchen-Gladbach, Germany

[73] Assignee: W. Schlafhorst AG & Co., Monchen-Gladbach, Germany

[21] Appl. No.: 58,676

[22] Filed: May 4, 1993

Related U.S. Application Data

[63] Continuation of Ser. No. 869,772, Apr. 16, 1992, abandoned.

[30] Foreign Application Priority Data

Apr. 16, 1991 [DE] Germany .................. 41 12 414.6

[51] Int. Cl.$^6$ ................................ B65G 25/00
[52] U.S. Cl. ................. 198/751; 198/761; 198/762; 198/770
[58] Field of Search ................ 198/444, 460, 198/463.6, 751, 757, 761, 762, 770, 460.1

[56] References Cited

U.S. PATENT DOCUMENTS

| | | | |
|---|---|---|---|
| 2,376,791 | 5/1945 | Lindsay | 198/762 |
| 3,053,380 | 9/1962 | Spurlin | 198/761 |
| 3,147,841 | 9/1964 | Austin . | |
| 4,000,807 | 1/1977 | Molique | 198/757 |
| 4,015,705 | 4/1977 | Dumbaugh | 198/770 |
| 4,216,416 | 8/1980 | Grace | 198/762 |
| 4,456,822 | 6/1984 | Rose et al. | 198/751 |
| 5,042,643 | 8/1991 | Akama | 198/757 |
| 5,054,606 | 10/1991 | Musschoot | 198/762 |

FOREIGN PATENT DOCUMENTS

| | | | |
|---|---|---|---|
| 2627848A1 | 2/1977 | Germany . | |
| 2630438 | 4/1978 | Germany | 198/463.6 |
| 3045824A1 | 8/1982 | Germany . | |
| 3600334A1 | 7/1986 | Germany . | |
| 3801835A1 | 8/1989 | Germany . | |
| 54-107075 | 8/1979 | Japan . | |
| 61-277511 | 12/1986 | Japan . | |

OTHER PUBLICATIONS

JP51-12 22 56, Published Oct. 26, 1976, Titled "Part Supply Regulating Apparatus".
Brochure, Published Nov. 2, 1984, Titled "Mattern Sortier Forderer".
Brochure, Published Aug. 13, 1979, Titled "RNA Schwingforder–Technik".

*Primary Examiner*—Joseph E. Valenza
*Attorney, Agent, or Firm*—Shefte, Pinckney & Sawyer

[57] ABSTRACT

A cop individualizing apparatus operates a circular conveyor of the type having a helical cop guide track on a vibratory basis by providing two unbalanced electromotors whose speed is controllably varied via a frequency converter alternating between two frequency stages as a function of the instantaneous cop supply requirement of an associated cop dispensing device fed by the individualizing apparatus, in order to assure advancement of the cops along the transport track of the circular conveyor in precise relation to the particular instantaneous cop requirement.

9 Claims, 2 Drawing Sheets

COP INDIVIDUALIZING APPARATUS

This is a continuation of application Ser. No. 07/869,772, filed Apr. 16, 1992, now abandoned.

BACKGROUND OF THE INVENTION

The present invention relates generally to textile yarn winding apparatus and particularly to a cop individualizing apparatus of the type provided with a circular cop container with a helical outer cop guide track and an arrangement for vibratorily oscillating the container to cause cops to be conveyed onto and along the track to a discharge end thereof for delivery to a cop dispensing device or apparatus.

The supplying of bobbin winding machines with cops to be unwound can take place in a variety of different manners. In addition to the possibility of a direct connection of the winding machine with a spinning machine, it is also very common to store the cops doffed from the spinning machine in cop containers on a temporary basis and to deliver them at a later time to a bobbin winding machine. However, since the cops must be individually dispensed for processing on the bobbin winding machine, various cop individualizing apparatus and devices have been suggested. So-called vibration conveyor devices have found the greatest commercial application.

For example, German Patent Application DE-OS 30 45 824 describes a cop individualizing system in which cops are dumped from the container of a cop carriage in random arrangement onto a vibration transport device which is followed by a so-called circular conveyor from which the cops are individually dispensed.

The state of filling of this circular conveyor is monitored by a sensor. If the conveyor falls below a predetermined state of filling, the vibration conveyor mounted in front is maintained in operation until the sensor mechanism of the circular conveyor has recognized that a desired state of filling has been achieved.

This circular conveyor forms the actual cop individualizing device and consists of a round container open at its top with an upwardly curved or arched, round central surface forming a container bottom and with a guide track located outwardly of the container bottom extending helically at an upward incline. This guide track is bordered to the outside by a wall surface which follows its spiral course and the guide track empties at its outer end into a cop dispensing device. The container is supported by means of an elastic or resilient mounting to a permanent base and can be oscillated by means of a vibration device for conveying the cops out of the central surface onto and along the guide track to the cop dispensing device. German Patent Application DE-OS 30 45 824 does not disclose the vibrator with particularity. However, electromagnets which cooperate with spring systems are in widespread use for this purpose. Moreover, unbalance motors are also known.

SUMMARY OF THE INVENTION

The invention has the basic object of providing an improved cop individualizing apparatus whose cop throughput capacity is increased over the state of the art.

Basically, the present invention is adapted for use in substantially any cop individualizing apparatus of the type which comprises a round open-topped transport container equipped with an upwardly extending round central surface forming the container bottom, an upwardly inclined helical guide track located outwardly of the container bottom, and a wall surface outwardly bordering the guide track and following its helical course; a resilient container supporting arrangement by which the container is mounted to a permanent base; and an arrangement for oscillating the container on the supporting arrangement to cause cops in the container to be conveyed from the central bottom surface outwardly onto and along the guide track to an outer discharge end thereof for delivery to a cop dispensing device.

Briefly summarized, the improvement of the present invention basically resides in the provision of the oscillating arrangement with at least one electric motor having a motor shaft with at least one unbalanced element fastened thereon, and a control system for utilizing a frequency converter associated with the electric motor for varying its speed of operation and, in turn, to vary the oscillation of the container. Preferably, two unbalanced electric motors are arranged in opposition to one another beneath the transport container at an inclination out of vertical counter to the direction in which cops are transported on the guide track within the container, with the control arrangement being adapted to drive the electric motors synchronously via the frequency converter.

The use of frequency-converter-controllable unbalanced electromotors makes possible control of the present apparatus as a function of the instantaneous cop requirement of the associated cop dispensing device, such as by a sensor located thereon, which results on the one hand that virtually no appreciable gaps or spacings arise between the cops along the guide track of the cop individualizing apparatus and on the other hand the cops are prevented from pushing into each other. The latter situation can result, if it is not avoided, in the creation of rather large gaps or spacings between successive cops, since cops which have been pushed over other cops are thrown back again into the central bottom surface of the container of the cop individualizing apparatus. Generally, the gap created thereby can not be closed or filled with another cop, especially if the remaining distance along the guide track to the cop dispensing device is not very great. This results in delays in the dispensing of cops at the cop dispensing device at the end of the conveyor track. In the present invention, the speed at which cops are transported to the dispensing device is immediately corrected by the frequency converter control of the unbalanced electromotors if the cop requirement fluctuates, such as a result of gaps between cops on the guide track. Such fluctuations will always occur, since it can not be assured that the rate at which downstream equipment supplied by the cop dispensing device with cops will always remain exactly uniform.

In an especially simple embodiment, the control arrangement is operative to alternate the frequency converter between two frequency stages or ranges corresponding to two differing motor speeds. The lower frequency stage may be selected, for example, so that the cops are maintained in their particular position along the guide track as a result of the generated oscillations of the container, their advance being cancelled in this instance by the force acting in the opposite direction which is produced by the inclination of the conveyor track. In the upper frequency stage, a rapid transport of the cops in the direction of the cop dispensing device is achieved. However, the higher frequency stage should not be so high that the force of thrust on the cops exceeds a certain measure or degree which would lead to the cops being pushed onto or into each other. In each case, this frequency is preset in accordance with the cop dimensions.

The alternation of the individualizing apparatus between these two frequency stages as a function of the cop requirements of the cop dispensing device accordingly assures that the cops are transported at speeds which are constantly adapted to this cop requirement with the result that the cycle time between successive ejections from the guide track is distinctly reduced. This requirement is becoming increasingly important as ring spinning plants seek to increase their productivity by reducing cop sizes while, at the same time, constantly increasing rewinding speeds in bobbin winding machines. It must therefore be assured that the cycle or interval time at which cops are supplied to the bobbin winding machine is minimized.

The control of the unbalanced electromotors by means of a frequency converter in various speed ranges has the advantageous result that the speed changes occur harmoniously, i.e., not in jerks, which results in particular in an increase of the service life of the motors. In addition, this prevents the transport container from executing a very great oscillation due to a jerky braking or restarting of the electromotor causing the cops to lose their ordered position along the transport track, which disadvantage would occur at every fluctuation in the cop requirement of the cop dispensing apparatus if the motors would be cut off to avoid the cops from pushing into or onto each other.

However, in order to avoid the situation that the unbalanced motor or motors would have to continue to run in the case of a relatively long absence of a cop requirement (e.g., if the bobbin winding machine were overfilled), the present invention also provides an electrical circuit in the control arrangement for cutting off the power supply to the motor if a rather long predetermined time is exceeded in which no cop requirement is present, which can be accomplished either by means of a rapid regulating down of current supply to potentiometers which are connected to the frequency converter or by means of a stored residual voltage in such a manner that the motor is harmoniously braked by means of lowering the oscillating frequency of the container.

In order to prevent jerky movements in this instance when the motors are started, the present invention provides a circuit which serves to initially bring about a momentary actuation of the several motors. As a result, flywheel masses which had not returned during the standstill of a motor into a stable position are jogged and move into this stable position. The motors are arranged in such a manner relative to each other that components of radial movement during oscillation cancel each other out during this operation. Thus, when the motors are fully started, the result is a harmonious start.

DESCRIPTION OF THE PREFERRED EMBODIMENT

Figure 1:
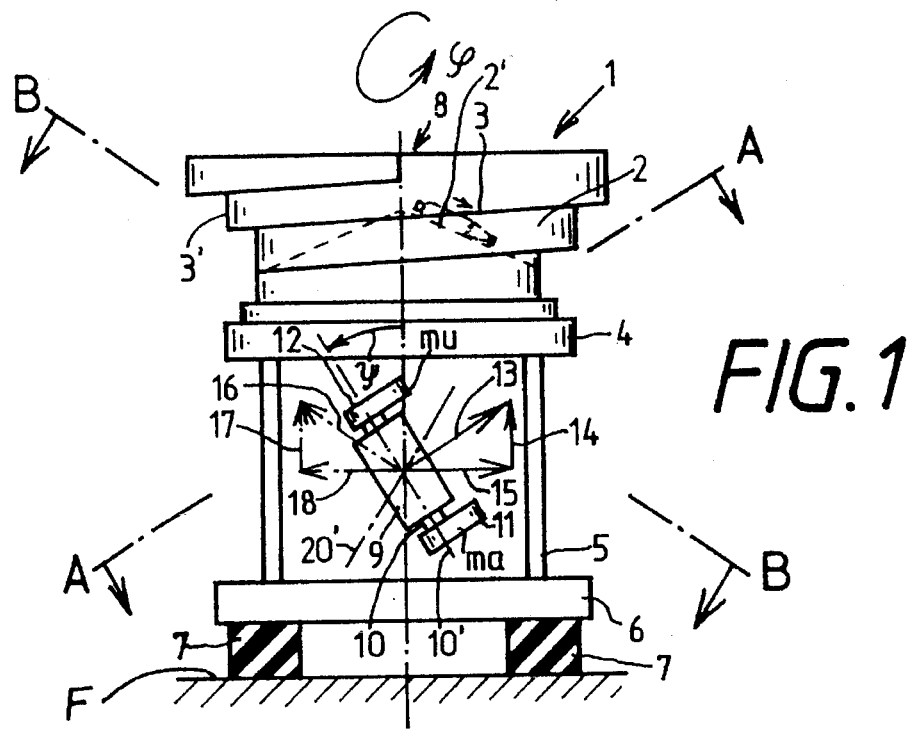
FIG. 1 shows a simplified front elevational view of a cop individualizing apparatus according to a preferred embodiment of the present invention.

Referring now to the accompanying drawings and initially to FIG. 1, the present cop individualizing apparatus basically includes a circular conveyor 1 comprising a round transport container 2 which is open at its top. The transport container 2 has an upwardly curved or arched round central surface 2' forming a bottom wall and a guide track 3 which extends helically at an upward incline outwardly of the container bottom wall 2'. A wall surface 3' outwardly borders and follows the helical course of the guide track 3. The cop supporting surface of guide track 3 is inclined gently downward and outward in a known manner in the direction of wall surface 3' in order to avoid unintended sliding of the cops from the guide track 3 onto the central bottom wall 2' of the transport container 2. The guide track 3 terminates at an upper end thereof which is connected or otherwise communicated with a delivery slide or chute (not shown) extending to a cop dispensing device to discharge individualized cops successively thereto, as representatively indicated at 8.

Details of the presentation of the cop individualizing apparatus itself and of the components located upstream and downstream thereof are known from German Patent Application DE-OS 30 45 824, among other sources, and therefore are not further described and illustrated herein.

The lower end of the transport container 2 is affixed to a first base plate 4, which is connected via a frame structure 5 to another lower base plate 6. The lower base plate 6 is supported by means of plural rubber feet 7 or other suitable resilient mounting members to a machine base frame F, which prevents any transfer of the vibratory motion of the cop individualizing apparatus onto the base frame. The rubber feet 7 are advantageously distributed uniformly over the circumference of the base plate 6. Alternatively, the base plate 4 could be connected to the base frame of the machine via legs or other uprights having rubber feet fastened to their lower end.

Two asynchronous electromotors, of which only one motor 9 is shown in FIG. 1, are mounted to the frame 5. The other motor (shown only at 31 in FIG. 4) is located on the side opposite the motor 9 and is inclined, as shown for motor 9 but oppositely thereto, out of the vertical towards the cop transport direction shown by the arrow above the circular conveyor 1. The inclination of the second motor which is not shown is indicated by a broken line 20' representing the central axis of the motor shaft 20 shown in FIG. 3. The inclination of the motor 9 is indicated by a broken line 10' representing its central axis extending along its motor shaft 10. The angle of inclination $\phi$ of the two motors from the vertical is the same in order to be able to compensate for radial forces arising during operation.

Unbalanced masses 11,12 are fastened in the same orientation on the drive shaft 10 of the motor 9 at both ends thereof. Similar unbalanced masses are affixed to the drive shaft 20 of the other motor (see FIG. 3). The action of the unbalanced masses during the operation of the motors may best be understood with reference to the vector representations appearing in FIGS. 1 to 3.

Figure 2:
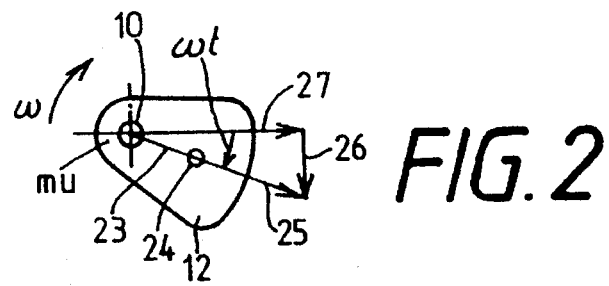
FIG. 2 is a cross-sectional view of the individualizing apparatus of FIG. 1 taken along line A—A thereof, showing the unbalanced mass at one end of one oscillating motor and the effects thereof during operation.
Figure 3:
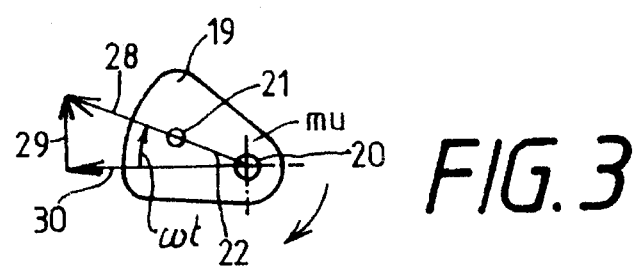
FIG. 3 is another cross-sectional view of the individualizing apparatus of FIG. 1 taken along line B—B thereof, showing the unbalanced mass at one end of the other oscillating motor and the effects thereof during operation.

In order to achieve an oscillating motion which brings about the transport of the cops in the direction of the cop dispensing device, the oscillating motion must necessarily have components of movement both in a horizontal and in a vertical direction. The particular horizontal component of movement must be located in a direction tangential to transport container 2, as indicated by vector arrows 27 and 30, which is achieved in that the unbalanced masses $m_u$ of one motor are phase-shifted by 180° to those of the other motor during operation, as will be seen in FIGS. 2 and 3. The radial components of movement indicated by vector arrows 26 and 29 in FIGS. 2 and 3 are therefore opposite and cancel one another out. This effect is achieved in that the two motors are arranged exactly opposite in such a manner that the two central points of their respective motor shafts 10 and 20 are located on a common straight line which intersects the vertical middle axis of the transport container and, as already indicated, their unbalanced masses rotate phase-shifted by 180°.

Notably, even if tangential components 27 and 30 face in opposite directions in FIGS. 2 and 3, they nevertheless act in the same circumferential direction relative to transport container 2.

The inclination of the two motors by the angle $\mu$ is in the range of approximately 30° and brings about vertical components of movement as indicated by vector arrows 14 and 17 in FIG. 1, which make possible the transport of the cops by means of superpositioning with the horizontal components of movement indicated by vector arrows 15 and 18. As can be seen in the position of the unbalanced masses 11,12 and 19 in FIGS. 1 to 3, the inclination of the motors toward the cop transport direction brings it about that horizontal components of movement 15,18 acting in the direction of cop transport occur simultaneously with the components of movement 14,17 acting vertically upward. These vertical components of movement increase the adhesion or clinging force tending to maintain the cops in contact with the conveyor track 3, as a result of which the tangential components of movement are transferred to the cops and the cops are transported thereby in the intended direction. In the oppositely directed phase, that is, when horizontal components of movement contrary to the direction of transport of the cops occur, the vertical components are simultaneously directed downward. As a result, the adhesion or clinging force on the cops is significantly reduced or is even briefly interrupted and, in turn, no entrainment force on the cops is produced in this horizontal direction, so that the intended transport of the cops to the cop dispensing device 8 follows therefrom in the final analysis.

If the angle $\mu$ is selected to be too large, the vertical components of movement during oscillation of the transport container 2 assume a dimension which causes the cops to lift off too much from the guide track 3, which produces both an uneven operation as well as the danger of causing damage to the cop windings. If the angle $\mu$ is selected to be too small, the return stroke phase of the unbalanced masses counter to the direction of cop transport can act more strongly on the entrainment of the cops in this direction, as a result of which the transport performance drops and the possibility of damage to the cop windings is likewise increased.

The resultant composite components of movement shown by vector arrows 13,16 in FIG. 1 are identical to the resultant composite components of movement indicated by arrows 25,28 in FIGS. 2 and 3, since the cross-sectional illustrations of these figures are taken in the plane of the resultant vectors 13 and 16.

Both the motor 9 shown in FIG. 1 as well as the opposing motor (not shown) carry flywheel masses $m_u$ on both ends of their respective motor shafts 10 and 20, which avoids an additional moment around the central points of the motors. In FIGS. 2 and 3, only the two upper flywheel masses 12,19 are shown. These flywheel masses 12,19 have respective centers of gravity 21,24 whose respective radii 22,23 determine the particular moment achieved by the masses. This moment determines the oscillating amplitude of the motors and therewith of the transport container 2. In contrast to known electromagnet/spring systems for oscillating transport containers in conventional cop individualizing apparatus, the directions of oscillation are generated by the unbalanced masses themselves.

Figure 4:
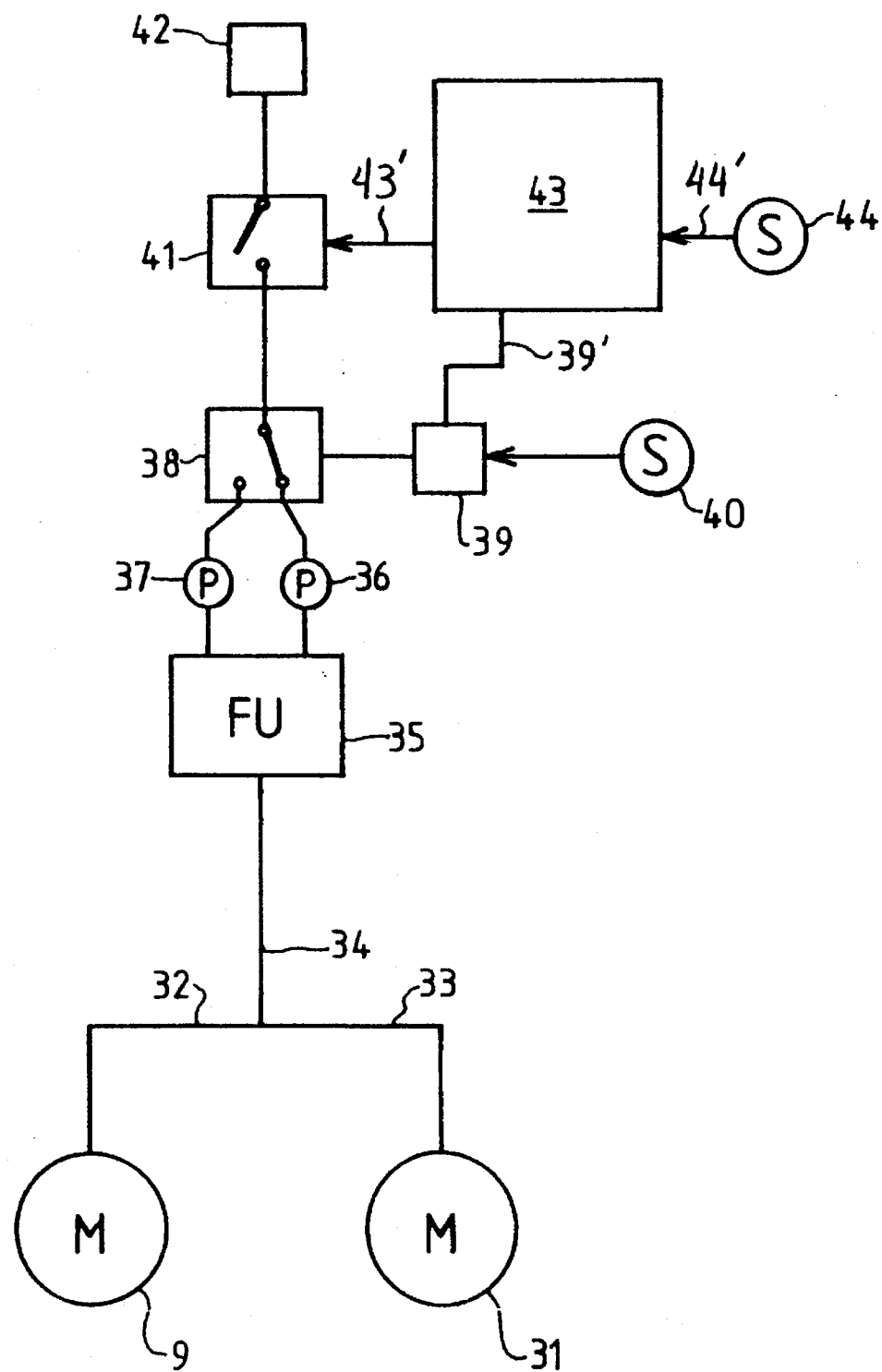
FIG. 4 is a simplified schematic circuit diagram of the control arrangement for the individualizing apparatus of FIG. 1.

The control system of the present invention for controlling oscillation of the motors 9,31 is shown in a schematic wiring diagram in FIG. 4. It can be seen from the wiring diagram of FIG. 4 that both motors 9,31 are connected by current supply leads 32,33 via a common current supply lead 34 to a frequency converter (FU) 35. This common current supply by the frequency converter 35 also assures synchronous running of both motors 9 and 31 (each of which as aforementioned is preferably an asynchronous motor), this synchronous running being essential for the proper functioning of the system. Thus, the vertical and the tangential components of oscillating movement must cooperate, as a result of which they are reinforced, whereas the radial components of movement must counteract in order to be able to cancel each other out.

The frequency converter 35 is operated via two potentiometers 36,37 selectively energized alternatively by a switching relay 38. These potentiometers 36,37 control the particular output frequency of frequency converter 35. They can be set manually in an analog manner, although the possibility is also contemplated of displaying the frequencies associated with the particular analog voltage values via a digital display. It is further contemplated that reference tables may be utilized for associating the voltage values with the particular frequencies. However, it will be understood that this association is a function of the dimensioning of the unbalanced masses as well as of the circular conveyor itself.

In the embodiment illustrated, the potentiometer 37 is selected and adapted for controlling a predetermined lower frequency output of the frequency converter 35 and correspondingly for producing a lower driven speed of the motors 9,31 and lower oscillating frequency of the container 2, whereas the potentiometer 36 is selected to control a relatively higher frequency output of the frequency converter and, in turn, a higher motor speed and container oscillating frequency.

The switching relay 38 is connected to a time switch 39, which is supplied with control signals from a sensor 40 and from a central control unit 43 via a control lead 39'. The sensor 40 is preferably located in the area of the cop dispensing device 8 and is adapted to recognize when a new cop has arrived at the cop dispensing device 8 after the dispensing of a cop. A gap or spacing between successive cops along the delivery chute to the cop dispensing device 8 results from the action of each dispensed cop at the upper terminal end of the guide track 3 in tipping downward into the slide or chute causing the back end of the cop to pivot upwardly corresponding to the inclination of the slide. The time interval between delivery of successive cops to the cop dispensing device during ongoing operation is determined by the time switch 39 based upon successive detection signals from the sensor 40.

In addition, a movable stop member (not shown) can be located on the slide or chute of the cop dispensing device 8 to selectively prevent a premature tipping downward into the slide of a cop at the terminal end of the guide track if the cop dispensing device is not yet free of the preceding cop. To this end, the slide can be monitored by a further sensor (also not shown) for controlling the stop member.

As will be understood, if such a stop member is moved into blocking position with respect to the slide to the cop dispensing device 8, the transport of cops along the transport track 3 must be interrupted within a relatively short time since the cops along the track 3 would backup and become separated, producing the disadvantages of the prior art already described. To avoid this occurrence, the time switch 39 is operative to actuate the switching relay 38 to switch the current supply 42 to the lower frequency potentiometer 37 and, as a result thereof, its lower frequency is output by the frequency converter 35, which is advantageously in such a range that cops on the guide track are not caused to move therealong. This switching to the lower frequency brings about a harmonious braking of motors 9 and 31, as a result of which the cops retain their ordered position along the transport track 3. As soon as the time switch 39 receives a signal from the stop member control sensor (not shown) that the slide is free again, the time switch reactuates the switching relay 38, which causes the frequency converter 35 to be connected again with the higher frequency potentiometer 36. When the motors 9,31 are accelerated to the corresponding higher cop transporting frequency, the stop member along the chute to the cop dispensing device 8 is then withdrawn in order that the interrupted dispensing of cops can be continued.

The central control unit 43 additionally receives signals from a sensor 44 which indicates the cop requirement of the associated bobbin winding machine (not shown) itself. The sensor 44 can be located, e.g., on a transport or conveyor system for individual carriers of the bobbin winding machine, such as peg trays, onto which the cops are set. If no empty carriers are present for cops to be placed on, this condition is recognized by the sensor 44, which transmits a corresponding signal via a lead 44' to the central control unit 43. The central control unit 43 controls a switch 41 via a control lead 43' which switch disconnects the switching relay 38 from the main power supply shown only representatively at 42.

If the sensor 44 subsequently signals a requirement of the winding machine for a supply of cops, the switch 41 is reclosed via the central control unit 43. At the same time, the time switch 39 is induced via the control lead 39' to switch the switching relay 38 to the higher frequency potentiometer 36, which position of the switching relay 38 may constitute its base or starting position to which it is automatically set upon opening of the switch 41.

When the two motors 9,31 have been stopped, their unbalanced masses $m_u$ normally assume a position offset by 180° from the illustration in FIGS. 1 to 3, which results from the inclination of the motors from the vertical in this direction. However, it will be recognized that, when stopped, one of the motors may remain standing in a position like that shown in FIGS. 1 to 3. In particular, if the center of gravity of the unbalanced masses of a motor has precisely attained its uppermost position at the time a stop occurs, there is the danger that the unbalanced masses may remain in this unstable position. When the unbalanced masses of the other motor assume their stable position, their mutual offset of 180° no longer exists. As a result, the aforementioned radial vector forces produced by the unbalanced masses would not be cancelled when the motors are re-started but rather would be reinforced and an undesired, strong oscillation would be generated when the motors are re-started, which not only would destroy the order of the backed-up row of cops along transport track 3 but can also cause damage to the apparatus itself.

For this reason the central control unit 43 is provided with a circuit by means of which the switch 41 is initially closed only momentarily upon each start-up of the motors 9,31, as a result of which their unbalanced masses are moved less than 180°. If the unbalanced masses were already situated in their stable position offset 180° from one another, they return immediately into such stable position, but if the masses were located in an unstable position, they are jogged out of this position and swing into the stable position. Subsequently, the control unit 43 re-closes the switch 41 one or several seconds later when the unbalanced masses have assumed or reassumed their stable position and, as a result thereof, a synchronous running operation is immediately achieved even when the motors are started from an unstable stopped position.

In order to adapt the transport capacity of the transport container 2 to different cop lengths, an adjustment of the two frequencies can be accomplished via the potentiometers 36,37, either with reference to a table prepared in relation to the particular circular conveyor 1 to cross-reference frequencies against differing cop sizes or by performing tests. The latter adjustment by testing does not require a great expense since it is possible to merely observe during the adjustment process how the cops move in the transport container. As previously indicated, the lower frequency should be adjusted so that the cops do not change their position along the transport track 3 during operation at the lower frequency. The upper frequency should be set so that the cops advance in an orderly manner along the guide track 3 without gaps arising between the cops and without cops being pushed over each other.

As those persons skilled in the art will recognize, the present invention makes it possible to use the circular conveyor 1 for individualizing empty cop tubes or cops having residual yarn and to adjust the conveyor operation accordingly.

The control tasks described above are basically relatively simple and can be assumed by a memory-programmed control unit such as is already present in conventional automatic bobbin winding machines, which control can assume the function of the central control unit 43 in the described embodiment.

It is to be further recognized that the present invention is not limited to the use of two motors. However, the use of a single motor has the disadvantage that the radial oscillating components of movement are not cancelled out. On the other hand, the use of more than two motors increases the overall expense of the apparatus. However, if more than two motors are used, they are to be arranged so that the phase shifts between their unbalanced masses are selected in such a manner that their radial forces are cancelled out.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. In a cop individualizing apparatus comprising a round transport container open at its top, the container having a round central surface extending upwardly toward the center of the container forming a container bottom, an upwardly inclined helical guide track located outwardly of the container bottom, and a wall surface outwardly bordering the guide track and following its helical course, the guide track having an outer discharge end for emptying into a cop dispensing device, resilient container supporting means for mounting the container to a permanent base, and means for oscillation of the container for causing cops contained therein to be conveyed from the central surface onto and along the guide track to its outer discharge end for delivery to the cop dispensing device, the improvement comprising the oscillation means comprising at least two electro-motors, each having a motor shaft and at least one unbalanced element fastened thereon, a frequency converter associated with the electro-motors for varying the frequency of the input voltage substantially simultaneously to said at least two electro-motors for varying their speed of operation, and control means for varying the output frequency of the frequency converter among a maximum operating frequency, a minimum operating frequency, and a plurality of differing intermediate operating frequencies therebetween as a function of the instantaneous cop requirements of the cop dispensing device.

2. The improvement in a cop individualizing apparatus according to claim 1, wherein the control means includes means to alternate the frequency converter between two frequency stages corresponding to two differing electromotor speeds.

3. The improvement in a cop individualizing apparatus according to claim 2, wherein the control means is arranged for selective adjusting of the two frequency stages as a function of the particular cop dimensions.

4. The improvement in a cop individualizing apparatus according to claim 2, wherein the control means includes a sensor located on the cop dispensing device and associated with the frequency converter alternating means for actuating alternations between the frequency stages in relation to the requirements of the cop dispensing device.

5. The improvement in a cop individualizing apparatus according to claim 1, further comprising a second electromotor, the electromotors being opposingly arranged under the container and inclined out of the vertical counter to the direction of transport of the cops, the control means being arranged for driving the electromotors synchronously via the frequency converter.

6. The improvement in a cop individualizing apparatus according to claim 1, wherein the control means includes a circuit for interrupting operation of the frequency converter if no cop requirement is present at the cop dispensing device for a predetermined period of time and for immediately reactuating the frequency converter when there is a cop requirement again at the cop dispensing device.

7. In a cop individualizing apparatus comprising a round transport container open at its top, the container having a round central surface extending upwardly toward the center of the container forming a container bottom, an upwardly inclined helical guide track located outwardly of the container bottom, and a wall surface outwardly bordering the guide track and following its helical course, the guide track having an outer discharge end for emptying into a cop dispensing device, resilient container supporting means for mounting the container to a permanent base, and means for oscillation of the container for causing cops contained therein to be conveyed from the central surface onto and along the guide track to its outer discharge end for delivery to the cop dispensing device, the improvement comprising the oscillation means comprising at least one electromotor having a motor shaft and at least one unbalanced element fastened thereon, and control means for varying the frequency of oscillation of the container as a function of the instantaneous cop requirements of the cop dispensing device, the control means including frequency converter associated with the electro-motor for varying its speed of operation, wherein the control means includes a circuit for interrupting operation of the frequency converter if no cop requirement is present at the cop dispensing device for a predetermined period of time and for immediately reactuating the frequency converter when there is a cop requirement again at the cop dispensing device and an additional circuit which is operative immediately following each reactuation of the frequency converter for temporarily interrupting its operation again for at least one second.

8. The improvement in a cop individualizing apparatus according to claim 1, wherein the control means includes potentiometers which can be manually regulated for readjusting the frequency stages.

9. In a cop individualizing apparatus comprising a round transport container open at its top, the container having a round central surface extending upwardly toward the center of the container forming a container bottom, an upwardly inclined helical guide track located outwardly of the container bottom, and a wall surface outwardly bordering the guide track and following its helical course, the guide track having an outer discharge end for emptying into a cop dispensing device, resilient container supporting means for mounting the container to a permanent base, and means for oscillation of the container for causing cops contained therein to be conveyed from the central surface onto and along the guide track to its outer discharge end for delivery to the cop dispensing device, the improvement comprising the oscillation means comprising at least two electro-motors each having a motor shaft and at least one unbalanced element fastened thereon, and control means including a frequency converter associated with the electro-motors, a circuit for interrupting operation of the frequency converter if no cop requirement is present at the cop dispensing device for a predetermined period of time and for immediately reactuating the frequency converter when there is a cop requirement again at the cop dispensing device and an additional circuit which is operative immediately following each reactuation of the frequency converter for temporarily interrupting its operation again for at least one second.

* * * * *